United States Patent
Sloan et al.

(10) Patent No.: US 7,195,159 B2
(45) Date of Patent: Mar. 27, 2007

(54) RADIO FREQUENCY IDENTIFICATION (RFID) MATERIAL TRACKING AND APPARATUS

(75) Inventors: Michael Sloan, Ellicott City, MD (US); Larry Blue, North Potomac, MD (US); Martin Adickes, Hawthorne, NJ (US); Nilan Solanki, Columbia, MD (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 11/025,961

(22) Filed: Jan. 3, 2005

(65) Prior Publication Data

US 2006/0086790 A1    Apr. 27, 2006

Related U.S. Application Data

(60) Provisional application No. 60/620,909, filed on Oct. 22, 2004.

(51) Int. Cl.
*G07B 15/02* (2006.01)
(52) U.S. Cl. .................. 235/384; 235/375
(58) Field of Classification Search .......... 235/384, 235/375, 382, 585, 462.01, 462.46, 487, 235/492
See application file for complete search history.

(56) References Cited

U.S. PATENT DOCUMENTS

| | | | |
|---|---|---|---|
| 4,631,845 A | 12/1986 | Samuel et al. | |
| 5,426,423 A | 6/1995 | Raimbault et al. | |
| 5,565,858 A | 10/1996 | Guthrie | |
| 5,729,697 A | 3/1998 | Schkolnick et al. | |
| 6,097,301 A * | 8/2000 | Tuttle | 340/693.9 |
| 6,163,260 A | 12/2000 | Conwell et al. | |
| 6,624,752 B2 * | 9/2003 | Klitsgaard et al. | 340/572.1 |
| 6,662,931 B2 * | 12/2003 | Bruun et al. | 198/617 |
| 6,703,935 B1 * | 3/2004 | Chung et al. | 340/572.7 |
| 2002/0038267 A1 * | 3/2002 | Can et al. | 705/28 |
| 2002/0073646 A1 * | 6/2002 | Von Gutfeld et al. | 53/54 |
| 2002/0167405 A1 | 11/2002 | Shanks et al. | |
| 2005/0029350 A1 * | 2/2005 | Jusas et al. | 235/451 |

* cited by examiner

*Primary Examiner*—Daniel StCyr
(74) *Attorney, Agent, or Firm*—Sterne, Kessler, Goldstein & Fox P.L.L.C.

(57) ABSTRACT

Methods, systems, and apparatuses for tracking items automatically are described. A radio frequency identification (RFID) tag is used with a material tracking system to enable the identification and locating of aviation assets in an airport environment. For example, passive (e.g., non-battery) RFID tags are attached to an aviation asset. Antennas are placed at locations where monitoring of assets is necessary. A local controller and RFID reader use the antennas to communicate with the passive RFID tags to determine the identity and location of the asset.

36 Claims, 17 Drawing Sheets

_US 7,195,159 B2_

RADIO FREQUENCY IDENTIFICATION (RFID) MATERIAL TRACKING AND APPARATUS

This application claims the benefit of U.S. Provisional Application No. 60/620,909, filed Oct. 22, 2004, which is incorporated herein by reference in its entirety.

BACKGROUND OF THE INVENTION

1. Field of the Invention

The present invention relates to the identification and tracking of items in an airport environment using radio frequency identification (RFID) technology.

2. Background Art

An RFID tag may be affixed to an item whose presence is to be detected and/or monitored. The presence of an RFID tag, and therefore the presence of the item to which the tag is affixed, may be checked and monitored by devices known as "readers."

Airports are required to track large quantities of items/assets, including passenger baggage. These items are checked into the airport by the passengers, and then are transported to the corresponding aircraft. What is desired is the ability to generate an automated manifest of assets being loaded into aircraft transports and containers. Current procedures require the use of manual labor to log each asset as it is being transported and loaded. The ability to identify locations of items within an aircraft or container is not possible with existing systems.

BRIEF SUMMARY OF THE INVENTION

Methods, systems, and apparatuses for tracking items automatically are described. A radio frequency identification (RFID) tag is used with a material tracking system to enable the identification and locating of aviation assets in an airport environment. For example, passive (e.g., non-battery) RFID tags are attached to an aviation asset. Antennas are placed at locations where monitoring of assets is necessary. A local controller/RFID reader uses the antennas to communicate with the passive RFID tags to determine the identity and location of the asset.

These and other objects, advantages and features will become readily apparent in view of the following detailed description of the invention.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
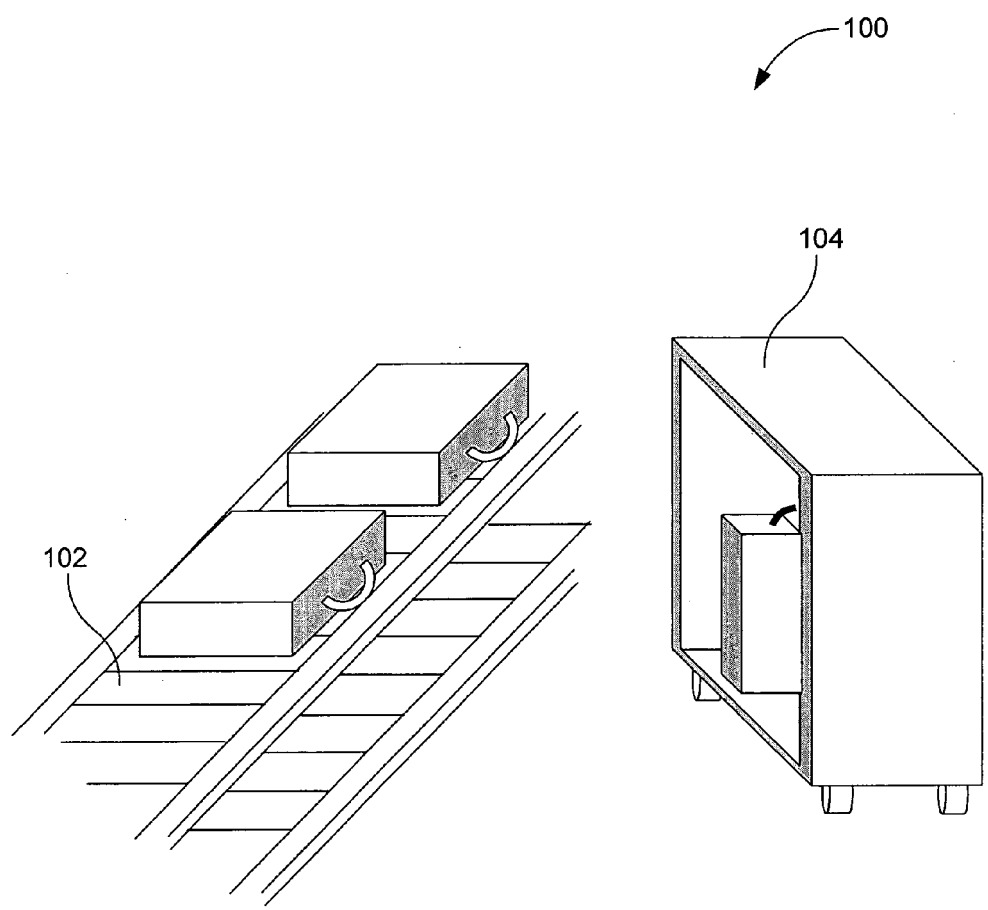
FIG. 1 shows an example layout of a lateral conveyor with unit load devices (ULDs) position alongside, according to an example embodiment of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

As described above, airports are required to track large quantities of items/assets, including passenger baggage. These items are checked into the airport by the passengers, and then are transported to the corresponding aircraft. What is desired is the ability to generate an automated manifest of assets being loaded into aircraft transports and containers. Current procedures require the use of manual labor to log each asset as it is being transported and loaded. The ability to identify locations of items within an aircraft or container is not possible with existing systems.

RFID enabled systems, apparatuses, and methods of the present invention allow for the automated collection of asset identities, and for location association for these assets. The present invention is the first to integrate RFID technology into an existing aviation process. The ability for the aviation industry to identify and locate assets in the transportation of goods, according to embodiments of the present invention, reduce cycle times, such as when security procedures require the removal of assets from aircraft.

In an example embodiment, a passive ultra-high frequency (UHF) radio frequency identification (RFID) tag is used with a material tracking system to enable the identification and locating of aviation assets in an airport environment. Passive (e.g., non-battery) RFID tags are attached to an aviation asset. Antennas are placed at locations where monitoring of assets is necessary. A local controller/RFID reader use the antennas to communicate with the passive RFID tags to determine the identity and location of the asset.

Example embodiments of the present invention are described below with respect to an aviation baggage tracking environment. It is noted that embodiments of the present invention can be adapted to the tracking of any types of objects in a conveyor system, including baggage.

Terms and Abbreviations

OMS=Object Management System (OMS). An OMS keeps track of objects being transported within an environment.

BMS=Baggage Management System (Bag Manager). A system that keeps track of baggage as being transported through an airport. A BMS can include hardware, software, firmware, and any combination thereof. A BMS is an example of an OMS, where the objects being tracked include baggage.

HKIA=Hong Kong International Airport. An example airport at which embodiments of the present invention can be implemented.

ARS=Aviation Reader Station. An example of a reader described herein.

OFU=Operator Feedback Unit. An indicator device that provides one or more indications of reader station operation. Can include any number and any type of indicator devices, including lights, sounds, and display, etc. Also can include any type of operator input devices, including buttons, a keyboard, a mouse, etc.

HHT=Hand Held Terminal. A hand held mobile device, such as a palm pilot, handheld computer, etc.

ULD=Unit Load Device. Refers to containers, pallets and pallet nets. An example purpose of a ULD is to enable individual pieces of cargo to be assembled into standardized units to ease the rapid loading and unloading of aircraft, and to facilitate the transfer of cargo between aircraft having compatible handling and restraint systems.

"Conveyor system" refers to all types of systems for conveying objects, including conveyor belts, conveyors that transport hanging objects, etc. A conveyor system may include one or more conveyors. The conveyors may convey objects in any direction, including horizontally, vertically, and any direction in between. A "lateral" conveyor is an example conveyor type, and refers generally to horizontally disposed conveyors (e.g., a conveyor belt that conveys objects in a direction generally parallel to the ground).

Reader System Embodiments

Embodiments for RFID reader systems supporting conveyors in a baggage area of an airport are described. Baggage travels along the conveyors, and in ULDs, to and from various airport destinations, such as passenger baggage drop-off, passenger baggage pickup, and aircraft loading/unloading areas. One or more read areas (also referred to as read points, read zones, etc.) are designated along the conveyors. One or more readers are designated to cover each read area. Thus, each read area is dedicated to a specified area of a conveyor and is responsible for monitoring and tracking bags being loaded into/onto a ULD (i.e., any container type, pallet, etc.), or from a ULD, placed in front of it.

For instance, an example system may use ARS readers, where each ARS reader has multiple reader units (e.g., antennas) that each have a respective read area/coverage area. In such a system, an ARS reader can control multiple read points along one or more conveyors.

When a flight is scheduled to be loaded, an operator uses a computing device, such as a hand-held terminal (HHT), to initially configure the RFID system on the appropriate conveyor. ULDs are logically linked to the read areas, and the system is enabled to start building a bag manifest for the flight. The reader(s) and read area(s) are responsible for capturing bag information and transmitting it to the BMS. The BMS makes a determination of whether or not a particular bag is legal to load into the ULD where the information was captured, and relays this information to the operator via a feedback mechanism called an operator feedback unit, or OFU. One or more OFUs are associated with each read point of the conveyor system. In an example embodiment, at the conclusion of the loading process, an OFU can be reset (if needed) (e.g., a button is pressed on the OFU), and the information collecting process is complete.

Conveyor System RFID Coverage

Embodiments of the RFID conveyor system uses one or more readers at each station to successfully interrogate tags in a robust manner. The conveyor RFID system accounts for every bag that is loaded into a ULD. Example conveyor RFID system embodiments of the present invention may be enhanced if the following conditions are adhered to, although in not all cases are they required:

(a) Appropriate reader radio frequency (RF) signal coverage is provided to each ULD to ensure that bags being placed into the ULD can be read.

(b) ULDs are positioned correctly in front of readers so that the reader antennas are directed/located in or near the middle of the ULD opening. In the case of a ULD requiring two antennas, the antennas can be configured in a variety of ways, including being equally spaced across the opening.

(c) Baggage handlers follow defined procedures to ensure bags are both being read by the RFID system and being placed into the appropriate ULD.

(d) A tag that is placed onto a bag is capable of being read (i.e. has not been removed or damaged, thus making it inoperable)

RFID Conveyor Coverage

ULD containers and conveyors pose a unique set of challenges with respect to RFID system implementation. For example, on conveyors, RFID tags can approach the reader from a number of directions that are not controlled by a user. Users walking directly in front of a reader antenna may reflect RFID energy onto conveyors thus causing additional unintended bag reads. The RFID coverage pattern of a particular reader can change, sometimes radically, as the loading process takes place. FIG. 1 shows an example layout 100 of a lateral conveyor 102 with ULDs 104 position along the side (to right side in FIG. 1). In an embodiment, in an example airport, a lateral conveyor system includes an upper and lower conveyor belt, each feeding bags in opposite directions.

Figure 2:
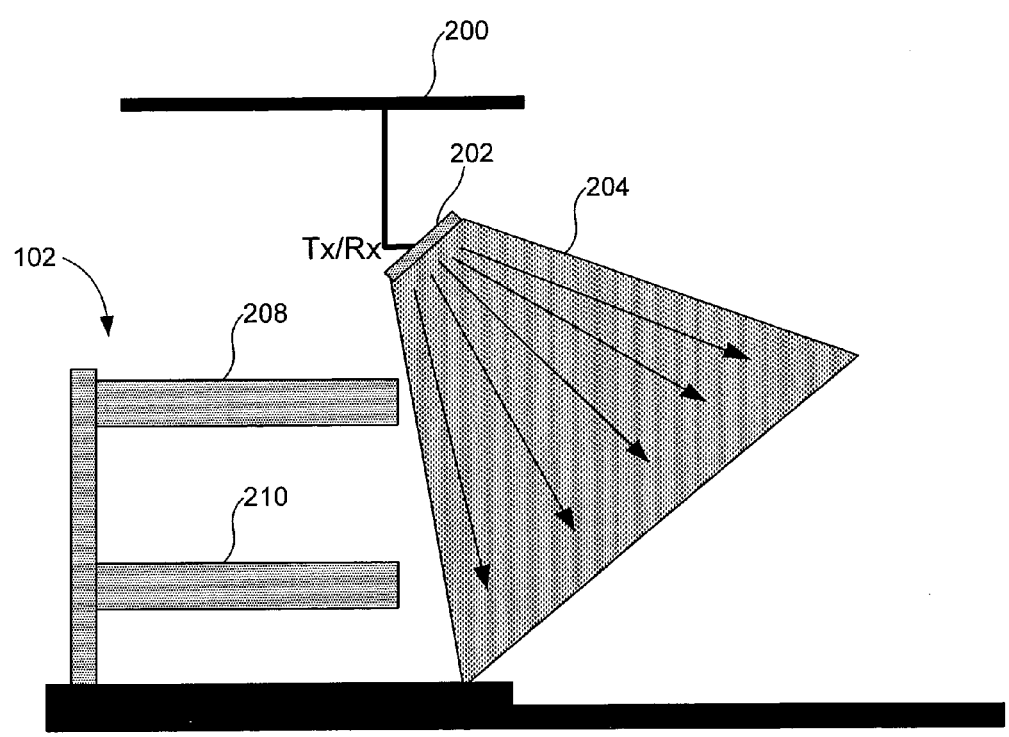
FIG. 2 shows an antenna of a conveyor system reader station having a coverage area adjacent to a conveyor that has an upper conveyor belt and lower conveyor belt, according to an example embodiment of the present invention.

Conveyor system reader antennas are normally aimed to provide maximum power to the area immediately in front of a ULD, while attempting to minimize any RFID power falling on the actual conveyor belts themselves. FIG. 2 shows such a configuration, where an antenna 202 of a conveyor system reader station 200 has a coverage area 204 adjacent to a conveyor 102 having an upper conveyor belt 208 and lower conveyor belt 210.

A difficulty arises when a ULD is placed in front of a lateral conveyor. Although ULDs can have a number of different forms and sizes, container-type ULDs can be classified into two main categories: (1) enclosed, meaning loading is performed through a single opening (e.g., a door) on a side of the container, and (2) open, meaning that there are two open sides (typically opposing sides) that utilize curtains to cover the openings rather than metal or hard plastic coverings. Loading of bags can occur through either open side.

Figure 3:
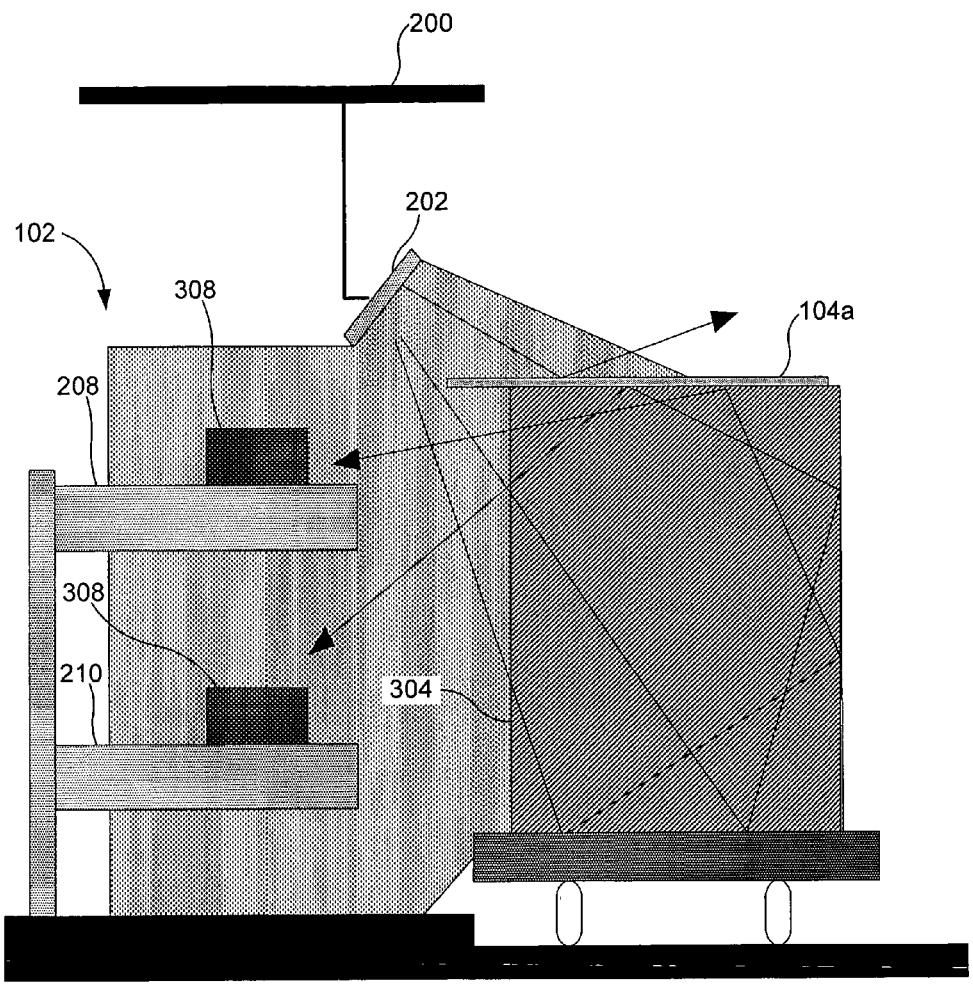
FIG. 3 shows an empty, enclosed ULD positioned with a door open in front of a conveyor system reader station, according to an example embodiment of the present invention.

FIG. 3 shows an empty, enclosed ULD 104a (e.g., made of aluminium) positioned with a door 304 open in front of a conveyor system reader station 200. Reader station 200 directs a read signal at ULD 104a to read tags attached to bags held within. As shown in FIG. 3, the interior of ULD 104a tends to reflect a substantial amount of energy 306 back past reader antenna 202 and onto conveyor 102, thus allowing reader station 200 to sometimes erroneously read or "see" nearby bags that are not contained in ULD 104a, such as bags 308 on one or both of belts 208 and 210. The actual number of bags 308 seen depends on a number of factors, such as size of ULD 104a, proximity to reader station 200, and an angle of ULD 104a relative to conveyor 102.

Figure 4:
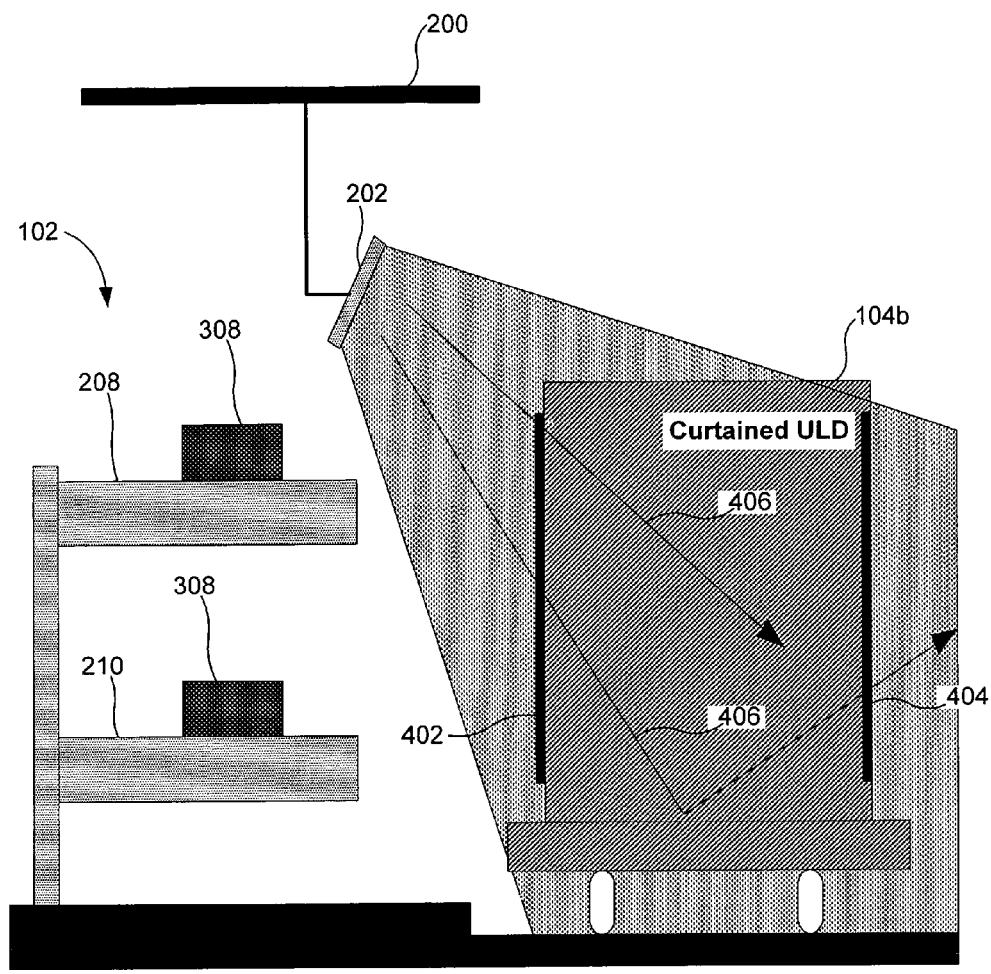
FIG. 4 shows a curtained ULD, having opposing first and second sides, each covered by a respective curtain.

FIG. 4 shows a curtained ULD 104b, having first and second sides 402 and 404, each covered by a respective curtain. The curtains are partially or fully transparent to the read signal transmitted by antenna 202. Thus, sides 402 and 404 of ULD 104b are considered "open" with respect to RF energy, as there are no sides (e.g., made of metal) to block or reflect RF energy. Curtained ULD 104b, being open on sides 402 and 404, does not exhibit the undesired energy reflection caused by enclosed ULD 104a of FIG. 3. Instead, energy 406 passes directly through, or is reflected through curtained ULD 104b.

Figure 5:
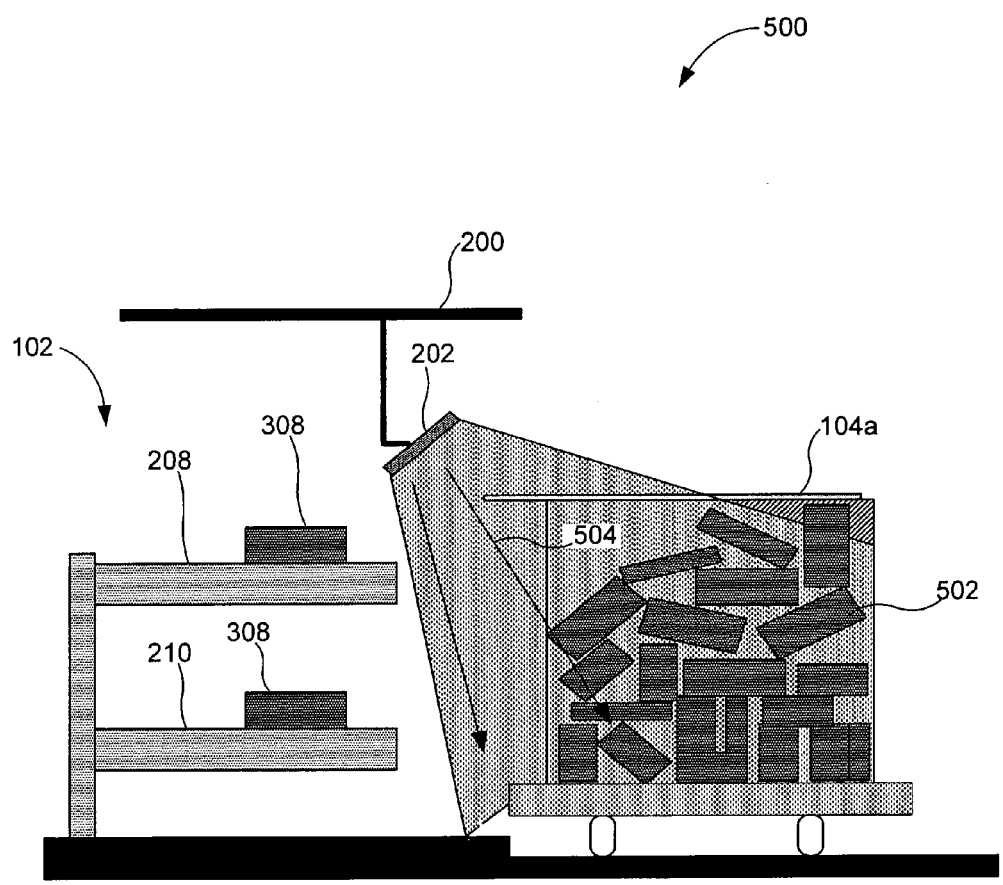
FIG. 5 shows the ULD of FIG. 3 after being filled with baggage, according to an example embodiment of the present invention.

As ULD 104a of FIG. 3 is filled with baggage, such as shown in FIG. 5, bags 502 inside ULD 104a tend to absorb RF energy 504 being directed into and reflected around the interior of ULD 104a. Thus, less energy is reflected out of a filled ULD 104a, and RF coverage with respect to conveyor 102 in FIG. 5 decreases to the point where coverage area 506 is similar to coverage area 204 of FIG. 2.

Figure 6A:
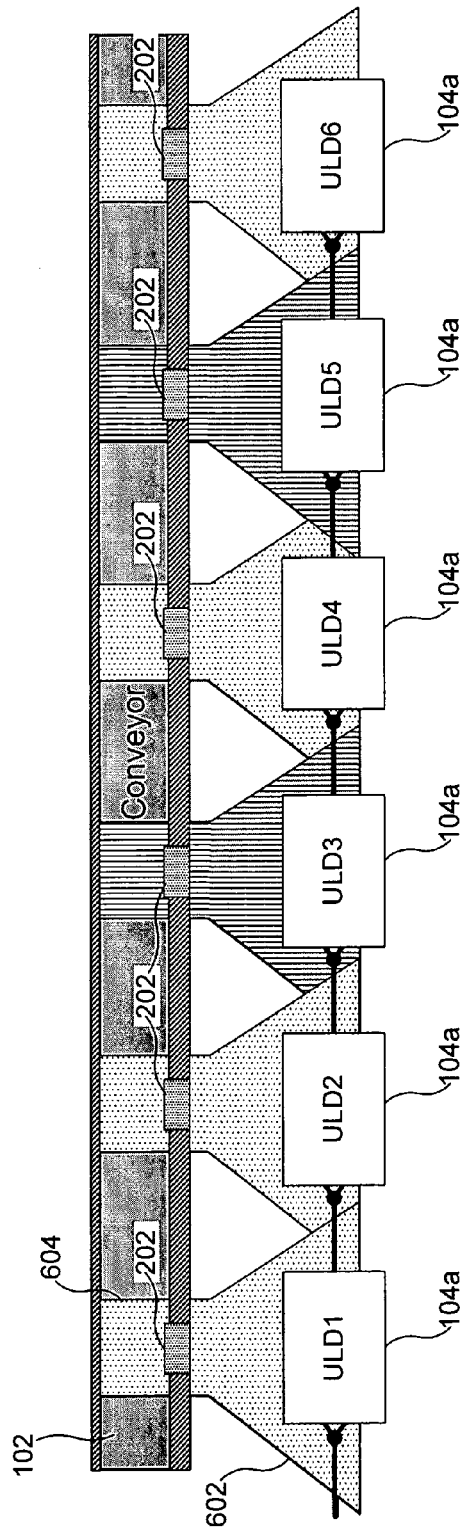
FIGS. 6A and 6B show plan views of example coverage configurations with respect to conveyors for empty and full ULDs, respectively, according to an example embodiment of the present invention.
Figure 6B:
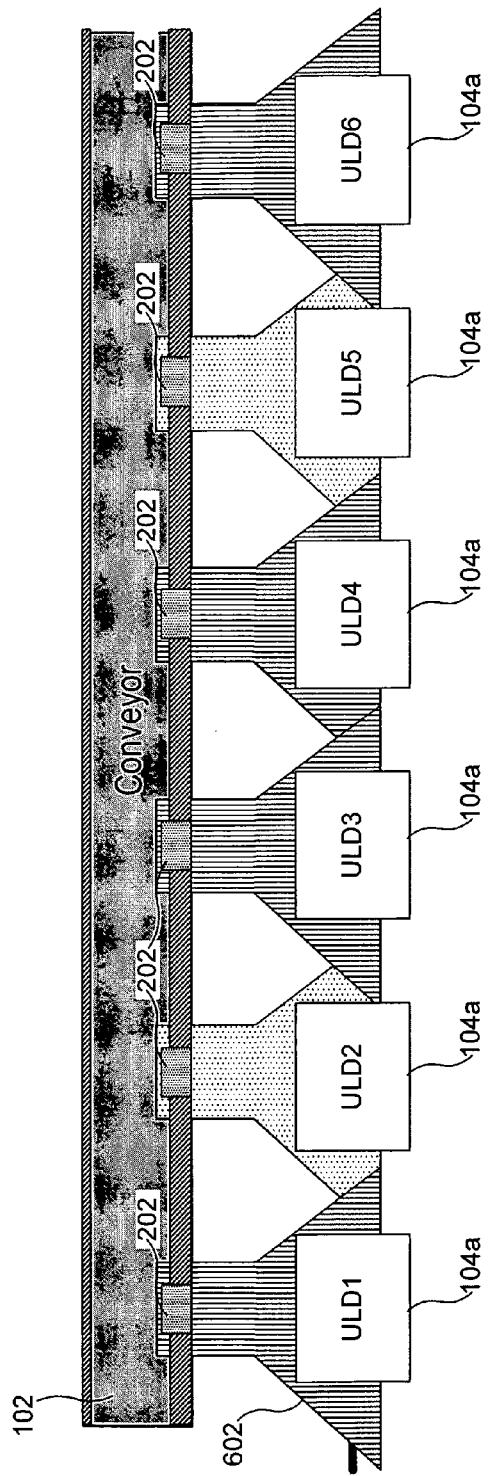

Thus, the actual RF coverage over conveyor 102 is dynamic, depending on the type of ULD 104, and how full is the ULD 104. FIGS. 6A and 6B show plan views of example coverage configurations with respect to conveyors 102 for empty ULDs 104a and full ULDs 104a, respectively. As shown in FIG. 6A, antennas 202 emit RF energy to ULDs 104a, over a respective coverage area/volume 602. Furthermore, as shown in FIG. 6A, because ULDs 104a are empty, energy 604 is reflected back, over conveyor 102. In contrast, as shown in FIG. 6B, where ULDs 104a contain baggage, substantial RF energy is not reflected.

Marking of Read Areas/positioning of ULDs

Figure 7:
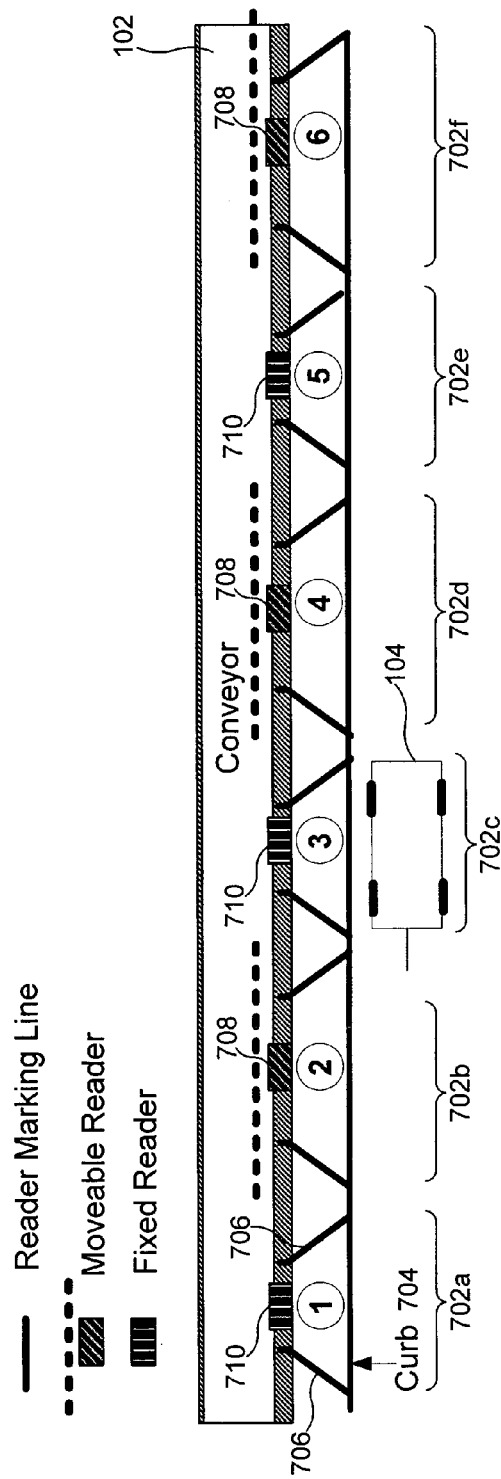
FIG. 7 illustrates an example read zone marking scheme, that includes a plurality of reading stations, according to an example embodiment of the present invention.

In order to minimize unwanted bag reads, each conveyor has read areas that are clearly marked, with the expectation that tags on bags entering a read area may be captured by the corresponding reader. FIG. 7 illustrates an example read area marking scheme 700, that includes a plurality of reading stations 702a–f. Each of reading stations 702a–f has corresponding reader marking lines 706 applied thereto, to show a read area corresponding to the respective reading station 702. A coverage area for each reading station 702 is between the respective reader marking lines 706. Thus, for example, reader marking lines 706 may be applied to the floor, etc., of each reading station 702 to show the corresponding read area.

Furthermore, each reading station 702a–f can optionally be marked to identify the reading station. For example, a large number identifying each reading station 702 can be used, which can be applied (e.g., painted) directly below each reader, such as on the floor near a curb 704. For example, each of reading stations 702a–f in FIG. 7 is marked respectively with a 1, 2, 3, 4, 5, and 6 identifying number. At each location, the identifying number can be placed at a center line of the coverage areas for the antenna, for example. The identifying number serves not only to identify the reader to a baggage handler, but serves as an alignment marker for a ULD 104. When ULDs 104 are positioned at each reader 702, the center of the ULD 104 lines up with the identifying number on the floor.

When a ULD 104 requires two readers, a first reader can be a fixed reader 710 a second reader can be a moveable reader 708. A moveable reader 708 is a reader that typically has a range of conveyor 102 along which it can be moved. The first and second readers can be positioned to maximize effective coverage of the ULD 104. For example, the opening of the ULD 104 can be positioned so that a fixed reader 710 is placed one-third of the distance from a side of the opening of the ULD 104, while a moveable reader 708 is placed one-third of the distance from the other side of the opening of the ULD 104. Thus, in this manner, two readers can be located between the sides of the ULD 104 to effectively read the ULD 104.

Conveyor Read Areas

Figure 8:
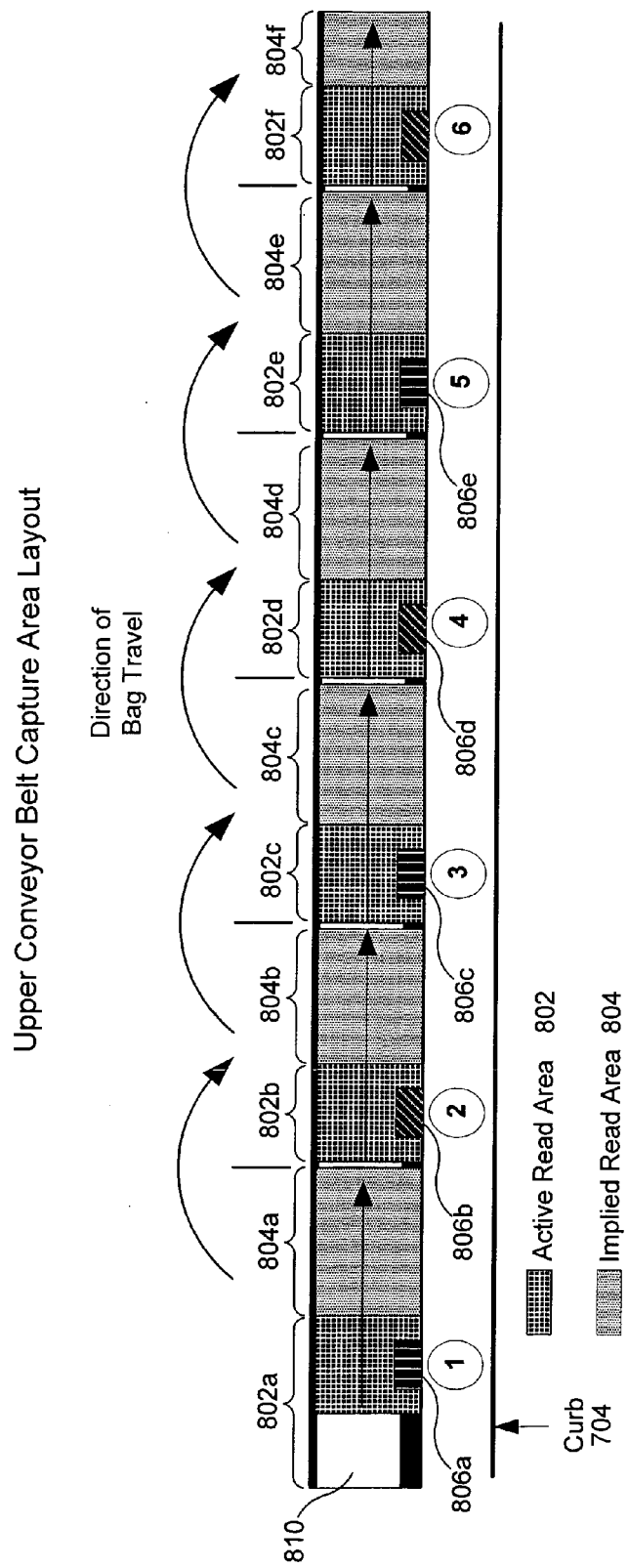
FIG. 8 shows read areas associated with each of six readers on a lateral conveyor, according to an example embodiment of the present invention.

Implementation of the RFID conveyor baggage handling system of the present invention can be based on a "last seen" logic. In other words, a bag is considered "assigned to" a particular ULD as soon as the reader associated with that ULD reads the bag and until such time as another reader reads the same bag. FIG. 8 shows read areas 802 and 804 associated with each of readers 702a–f on conveyor 102. For simplicity, RF signal coverage in front of and into ULDs 104 in FIG. 8 is not explicitly shown, while the area pertaining to the conveyor 102 is shown.

In the example of FIG. 8, conveyor 102 is shown as having a series of "active" read areas 802a–f alternating with "implied" read areas 804a–f. As a bag travels 810 along conveyor 102, it will always be in either an active read area 802a–f or an implied read area 804a–f.

Active read areas 802 are those areas covered by a reader 806 (either fixed or moveable), whereby a tag (e.g., attached to a bag 810), upon entering the active area, has the potential of being read. Typically, a RFID coverage area for conveyor 102 is configured so that reads of bags 810 on the conveyor belt are kept to a minimum. Because of the nature of RFID, however, bags may occasionally be read on the conveyor (which may be a belt, for example) due to the location of where the operator is standing (e.g., a reflection), how full the ULD is, where the bag is on the conveyor, and where the ULD was parked relative to the reading antenna.

Implied read areas 804 are areas not covered by a reader 806. Bags 810 in an implied read area 804 cannot be read by an antenna. Thus, by using "last seen" tracking logic, bag 810, when in an implied read area 804, can be inferred as belonging to the last reader 806 that "saw" (i.e., read) it. Bag 810 will continue to be "owned" or tracked by the last reader 806 until it is "seen" (i.e., read) by a new reader 806. Therefore, in the case that bag 810 is traveling on a belt of conveyor 102, and that bags 810 travel in one direction on a particular belt, the implied read area 804 of a particular reader 806 is the belt area in the direction of belt travel (i.e., downstream of the reader), in the portion of the belt from the end of the active read area 802 of the reader to the beginning of the active read area 802 of the next reader.

Thus, in an embodiment, a particular bag can be tracked along a conveyor (e.g., by a user and/or computer system) having a known configuration (e.g., location of active read areas, location of active implied read areas, speed and timing of conveyor, etc.), by determining the presence of the bag in an active read area, and implying its location as it moves through implied read areas, until its updated location is determined in subsequent active read areas, etc.

Figure 9:
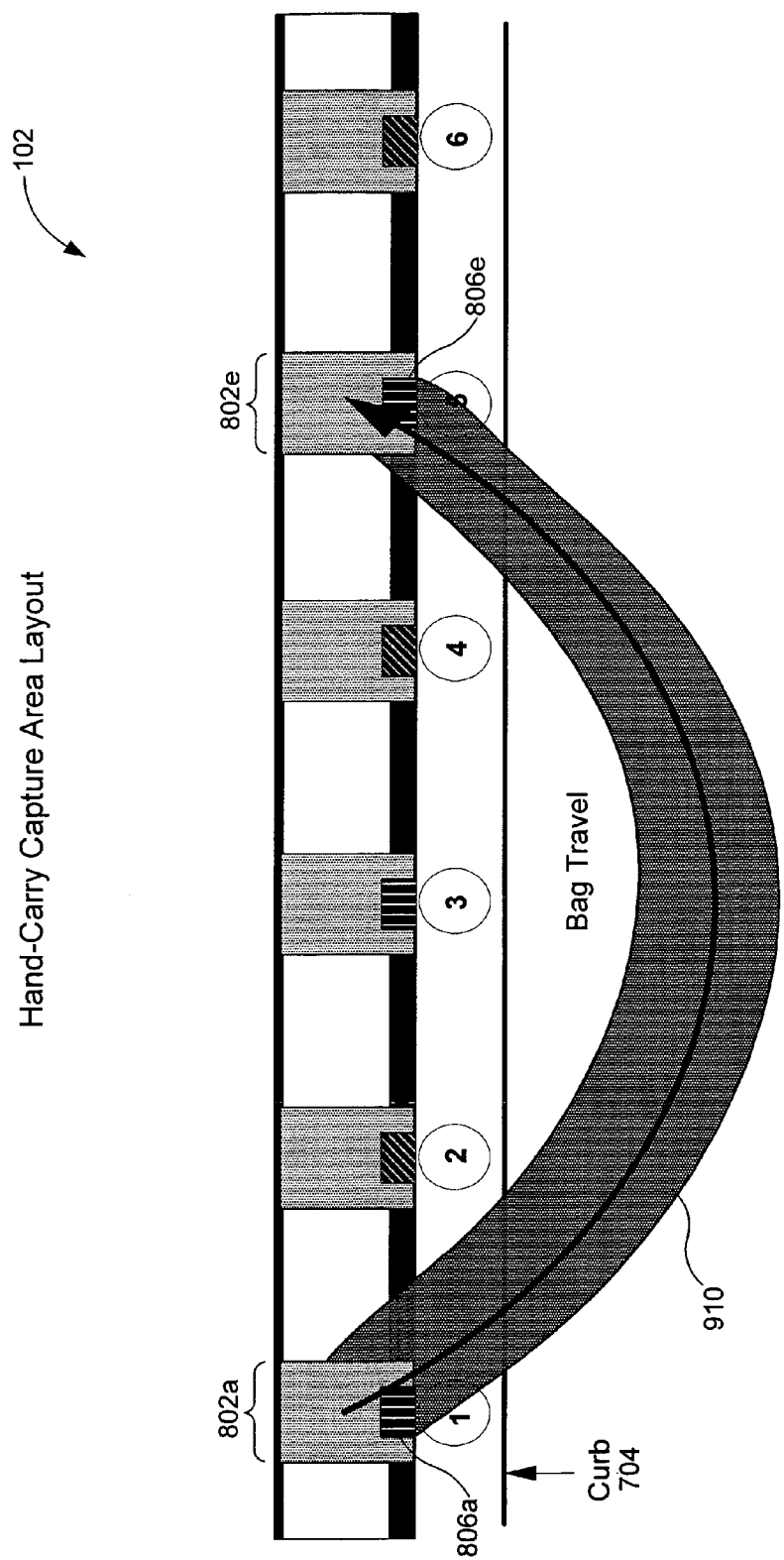
FIG. 9 shows a bag being removed from an active read zone of a reader, and carried behind ULDs to another reader, according to an example embodiment of the present invention.

In an embodiment, once a bag leaves an active read area 802, non-read areas are implicitly associated with the reader until the bag moves into another active read area. An example of this is illustrated in FIG. 9. In FIG. 9, a bag 910 is present in an active read area 802a, where it is read by reader 806a. Bag 910 is then removed from active read zone 802a of reader 806a, and is carried behind ULDs (not shown in FIG. 9) to reader 806e. Thus, in FIG. 9, bag 910 is associated with reader 806a until read by reader 806e in active read zone 802e.

Figure 10:
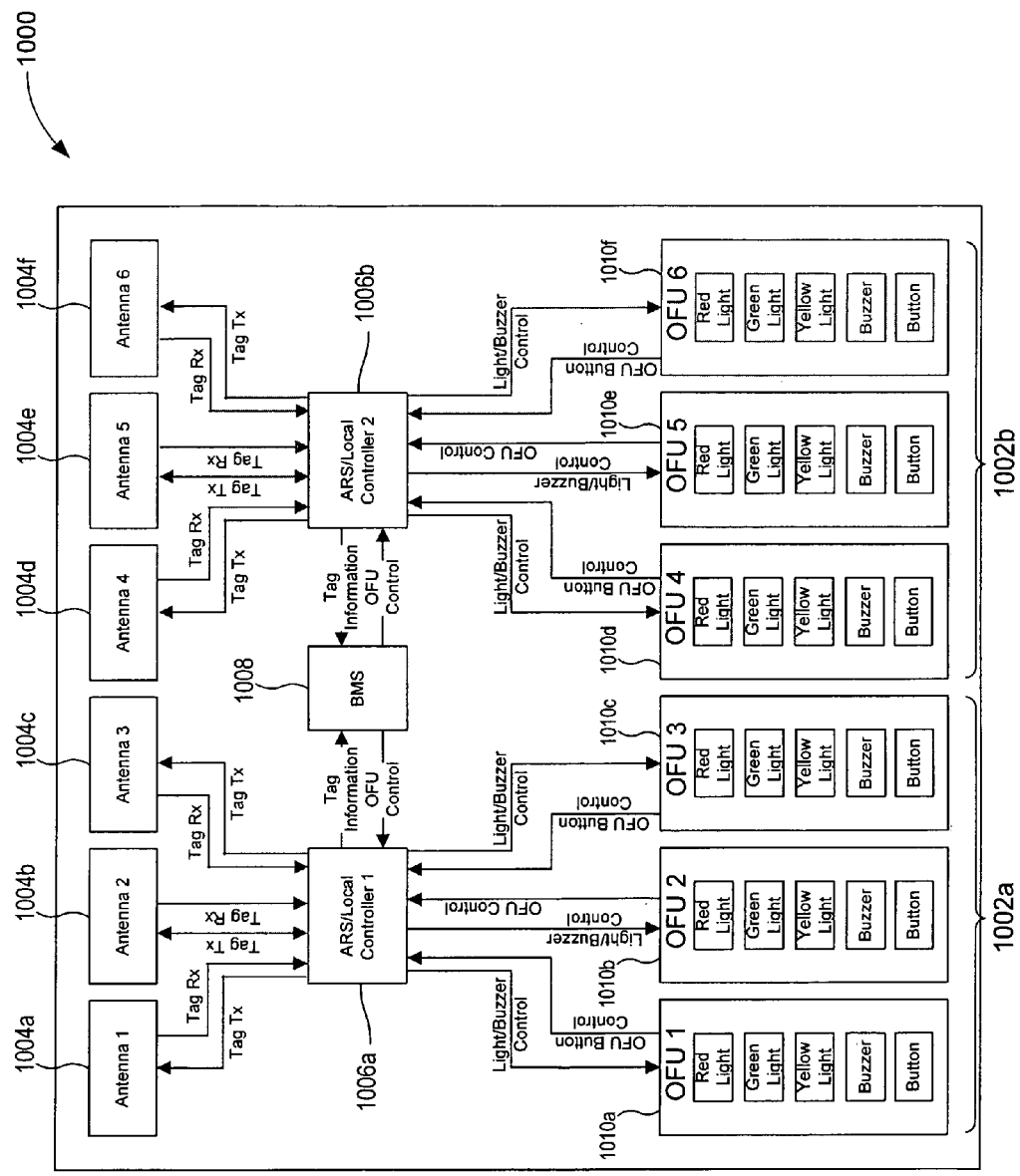
FIG. 10 shows an example RFID system architecture to be used with conveyor systems, according to an example embodiment of the present invention.

RFID baggage (or other object) tracking systems according to embodiments of the present invention can be configured in a variety of ways. In an example embodiment, similar to the configuration shown in FIG. 8, the RF coverage for a conveyor is configured so that when ULDs are positioned in front of readers, six non-overlapping reader areas are established. However, the present invention is not limited to six reader areas, and can have any number of one or more reader areas, any number of conveyors, etc Example Block Diagram FIG. 10 shows an example RFID system architecture 1000 in support of the conveyor system embodiments described above. Architecture 1000 is shown for illustrative purposes, and is not limiting. Architecture 1000 can be modified in various ways, as would be understood by persons skilled in the relevant art(s). These modifications are within the scope and spirit of the present invention. For example, architecture 1000 can be applied to environments other than the baggage management environment described below.

In the example embodiment of FIG. 10, each conveyor system will have two reader systems 1002a and 1002b installed. In FIG. 10, first reader system 1002a includes three antennas 1004a–c, while second reader system 1002b includes three antennas 1004d–f. Antennas 1004a–c are coupled to a baggage management system (BMS) 1008 through reader/local controller 1006a, and antennas 1004d–f are coupled to BMS 1008 through reader/local controller 1006b. In the current embodiment, antenna 1004f is optional, depending on the type of conveyor system being supported.

In alternative embodiments, any number of one or more reader systems 1002 may be present in an architecture 1000, depending on the particular application. Furthermore, any number of one or more antennas 1004 may be present for each controller 1006, depending on the particular application.

BMS 1008 is a system that keeps track of baggage (and/or other objects) as the baggage is being moved through an airport (or other location). BMS 1008 includes hardware, software, and/or firmware, including any combination thereof, to perform its functions. For example, BMS 1008 may be incorporated into a computer system. BMS 1008 includes one or more storage devices for storing location of bags, such as memory components, disc-based storage, magnetic storage devices, optical storage, etc. Furthermore, BMS 1008 can include a user interface, such as including a keyboard, display, graphical user interface (GUI), pointing device, and/or other visual and/or audio indicators, for interacting with the BMS as needed.

BMS 1008 receives tag information from, and outputs control information to controllers 1006a and 1006b. Controllers 1006a and 1006b cause antennas 1004a–1004c and 1004d–1004f, respectively, to transmit read signals to tags attached to baggage. Antennas 1004a–1004c and 1004d–1004f receive tag responses, and transmit them to controllers 1006a and 1006b, respectively. Demodulation of the received signals can occur at antennas 1004a–f, or can be performed by controllers 1006a and 1006b, depending on the particular system configuration. Thus, BMS 1008 uses controllers 1006a and 1006b to determine tags that are present at the read areas of antennas 1004–1004f.

Each antenna 1004a–f is logically associated by BMS 1008 to a ULD 104. In an example embodiment, each antenna 1004a–f has a separate transmit and receive side. To minimize signal loss, each side is serviced by a set of two cables. For example, LMR 400 low loss cable can be run from a respective reader 1002a and 1002b as far as possible, typically to the beginning of the service loops for any moveable readers. LMR 240 cable, which is more flexible, can be run for the remainder of the distance. However, the present invention is not limited to these particular antenna and cable implementations.

At least one interface, referred to as an operator feedback unit (OFU) 1010, is present for an operator to interact with antennas 1004. For example, in FIG. 10, OFUs 1010a–c are coupled to controller 1006a, and OFUs 1010d–f are coupled to controller 1006b.

In the example of FIG. 10, each OFU 1010 is shown including a red light indicator, a green light indicator, a yellow light indicator, a buzzer indicator, and a button. These are shown for illustrative purposes, and are not intended to limit the invention. An OFU 1010 can include any type of indicator/input-output device as described elsewhere herein, or otherwise known, as would be understood to persons skilled in the relevant art(s).

For example, a button on an OFU 1010 can be pressed to start/stop data capture associated with one or more antennas 1004. Thus, an OFU 1010 can be used to initiate reading of tags in one or more read areas. For example, an OFU 1010 can be used to initiate reading of tags in a read area, in relation to a ULD 104 present in the read area. When a bag is placed into the ULD 104, the tag associated with the bag is read, and the information is transmitted to BMS 1008. BMS 1008 determines which antenna 1004 "saw"/read the tag. Based on this, BMS 1008 determines which ULD 104 is associated with the particular antenna 1004, and triggers an indicator (e.g., light/buzzer or other) sequence at an appropriate OFU 1010 associated with the antenna 1004. For example, the indicator indicates whether the bag was loaded into the proper ULD. After a ULD is completely loaded, a button on the respective OFU 1010 can be pressed to close the session and prevent any additional information from being recorded. An example OFU 1010 is described in further detail below.

Control Logic for ULD Baggage Handling

In an embodiment, each RFID reader 1002 on a conveyor system is equipped with an OFU 1010 which indicates through indicators, such as a series of lights, one or more buzzers, a display such as a light-emitting diode (LED), liquid crystal diode (LCD), cathode ray tube (CRT), etc., or other indicator, whether a bag that a reader 1002 has read belongs in the ULD associated with that particular reader.

The following table outlines feedback control logic supporting an OFU, according to an example embodiment of the present invention.

| Event | Green Light Status | Red Light Status | Yellow Light Status | Buzzer State (duration) | Remark |
|---|---|---|---|---|---|
| "Off Duty" Mode (1) | Off | Off | On | Off | Same as "ULD Close" event |
| ULD Registration (2) | On | On | On | On (3 sec) | indicates ULD is ready for loading |
| Press open ULD button (3) | | | | | |
| Load bag in correct ULD (4) | On | Off | On | On (1 sec) | |
| Load bag in incorrect ULD (5) | Off | On | On | On (3 sec) | indicates bag should be loaded in a different ULD, or check with computing device |
| Press close ULD button (6) | Off | Off | On | Off | |
| System fault (7) | Flash | Flash | On | On (3 sec) | Inform supervisor, fallback to computing device |

(1) "Off duty mode" is indicated by the OFU when tag reading is not desired, such as when baggage is not being loaded into a ULD.

(2) "ULD registration" can be used to associate a particular ULD with an antenna, for example.

(3) "Press open ULD button": An operator presses a button of the OFU (or otherwise interacts with the OFU) to logically open a ULD for loading of baggage, for example.

(4) "Load bag in correct ULD" is indicated when a read tag is approved by the BMS as being loaded into the proper ULD.

(5) "Load bag in incorrect ULD" is indicated when a read tag is determined by the BMS as not being loaded into the proper ULD. In such a situation, the bag should be put aside, or should be loaded into a proper ULD. Alternatively, the operator's computing device can be used to check, and correct if necessary, system configuration. In an example embodiment, the computing device communicates with the BMS, by either a wireless or wired connection.

(6) "Press close ULD button": An operator presses a button of the OFU (or otherwise interacts with the OFU) to logically close a ULD for loading of baggage, for example.

(7) "System fault" may be indicated when a system problem occurs, to alert a system operator, as such.

In embodiments, OFUs may include any one or more of these features and/or alternative features, as desired for the particular application.

Conveyor System Baggage Handling Logic

This section describes baggage handling logic used to support successful reading of tagged bags going into ULDs, according to embodiments of the present invention. Reading of tags is highly dependant on a number of factors. Example conditions that can affect the speed or success of tags reading include:

(a) Tags placed on metal cases or other surfaces hostile to RFID environments;

(b) Tags read at an angle relative to the reader antenna;

(c) Persons standing between the reader and the tag;

(d) Location of the ULD relative to the antenna;

(e) Type of ULD;

(f) Damage to the tag; and (g) Contents of bag being tracked.

Thus, to encourage a high read rate, loading procedures should be followed in a systematic and consistent manner. The following example procedures aid in increasing read consistency. In an example environment, the following initial-state assumptions regarding the setup and operation of the overall conveyor system are appropriate:

(a) ULDs are positioned in front of the appropriate reader, with the center of the ULD aligned to the center of the reader.

(b) ULDs do not have to be connected. However, they maintain a separation distance to avoid misreads into adjacent ULDs.

(c) Any reader not servicing a ULD should be turned off, or configured so that it is not feeding information to the BMS.

(d) Heavy bags should be handled by two workers for placement into a ULD (e.g., to avoid damage to tags, etc.).

When a tag is read on a conveyor, this is not necessarily an error condition or misread, as baggage handlers typically utilize the conveyor to move a bag as close as possible to the ULD prior to loading. Misreading of bags can occur when bags that are placed inside a ULD are visible to reading stations that are not supposed to be covering that particular ULD.

An important metric of a conveyor system is to support a 100% correct bag count and accurate manifest generation.

As described above, RFID coverage in front of a ULD is dynamic. Tag reads on the conveyor are difficult to entirely eliminate, and will vary depending on how full the ULD is loaded and where the baggage handler is standing.

Figure 11:
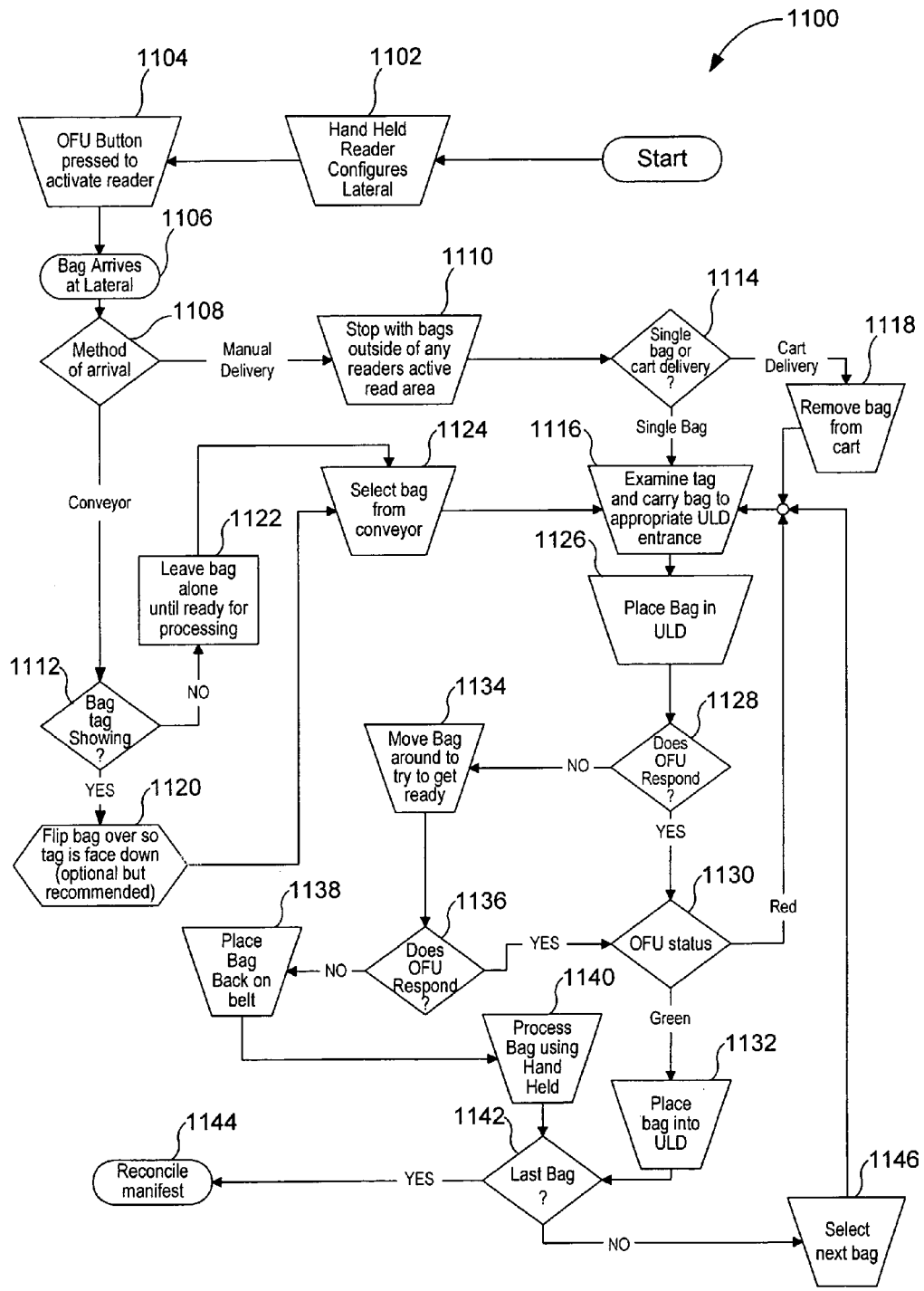
FIG. 11 shows an example flowchart providing baggage handling logic for a conveyor system, according to embodiments of the present invention.

FIG. 11 shows an example flowchart 1100, providing baggage handling logic for a conveyor system, according to embodiments of the present invention. The steps of FIG. 11 do not necessarily have to occur in the order shown, as will be apparent to persons skilled in the relevant art(s) based on the teachings herein. Furthermore, not all steps of flowchart 1100 are required in every application, and in some applications, additional or alternative steps occur. These alternative embodiments are also within the scope and spirit of the present invention. Other structural embodiments will be apparent to persons skilled in the relevant art(s) based on the following discussion. The steps of flowchart 1100 are described in detail below.

In step 1102, a hand-held terminal (or other computing device) configures a conveyor. Operation proceeds to step 1104.

In step 1104, an OFU button is pressed to activate a reader. Operation proceeds to step 1106.

In step 1106, a bag arrives at the conveyor Baggage arriving at the conveyor system typically arrives via an automated transfer system, which delivers the bag via a metal chute to the head of one of two conveyors. Baggage can also be delivered from areas external to the conveyor, such as "hand carries" or carts of luggage from another conveyor system, or by other procedures. Operation proceeds to step 1108.

In step 1108, if the bags arrive via manual delivery, operation proceeds to step 1110. Alternatively, if the bags arrive via conveyor, operation proceeds to step 1112.

In step 1110, the bags arriving via manual delivery are stopped outside of any readers active read area. Operation proceeds to step 1114. Baggage arriving from an external area should be placed outside of the active read areas on the lateral conveyor line so that they are not seen/read by the tracking system until they are ready to be placed inside a ULD.

In step 1114, if a single bag is being manually delivered, operation proceeds to step 1116. Alternatively, if a cart containing a plurality of bags is being delivered, operation proceeds to step 1118.

In step 1116, the tag of the bag is examined, and the bag is transported to the appropriate ULD. Operation proceeds to step 1126. For example, the tag may include text information, a bar code, or other information, that would indicate to an operator which ULD is appropriate for the corresponding bag. In an embodiment, a barcode tag on each bag coming from an external area can be examined to determine the appropriate ULD to which the bag is delivered.

Figure 12:
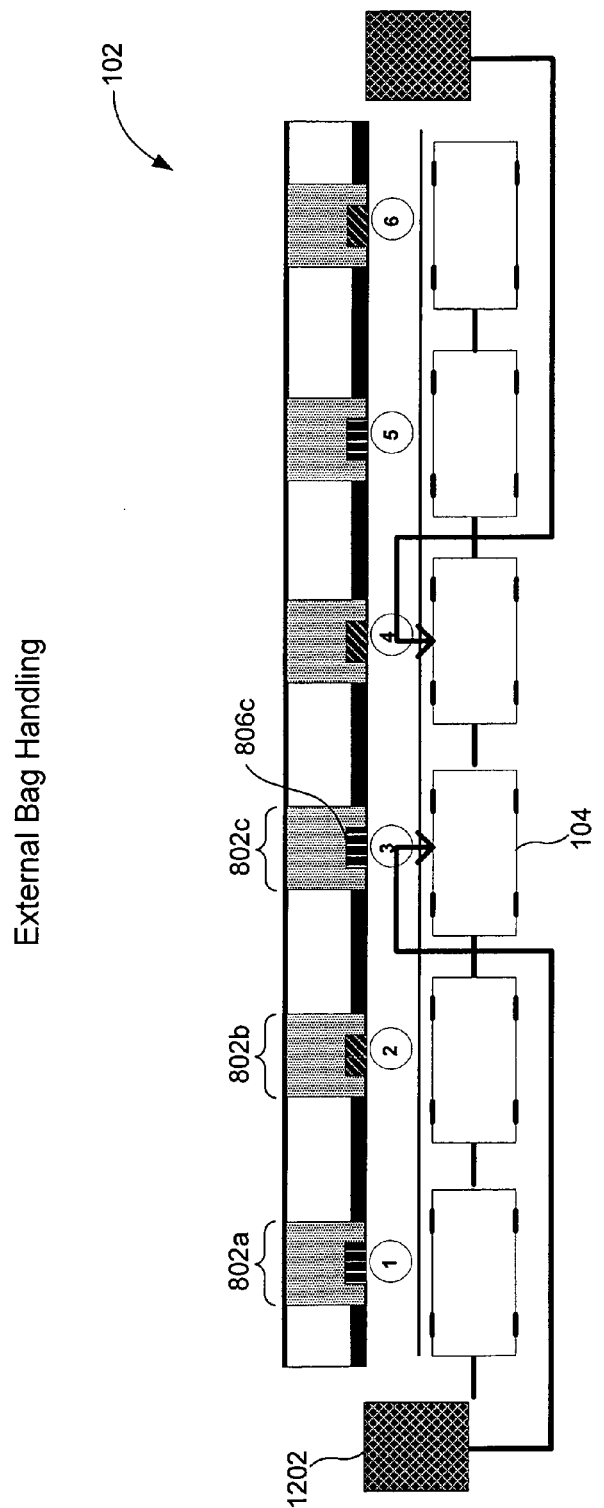
FIG. 12 shows a bag being placed in a ULD in an active read area of a reader, according to an example embodiment of the present invention.

For example, FIG. 12 shows a bag 1202 being placed in a ULD 104 in an active read area 802c of a reader 806c. As shown in FIG. 12, bag 1202 is transported in a manner to avoid entering active read areas 802a and 802b, to prevent an inadvertent reading. Note that a bag can alternatively be taken in front of ULDs 104 to a desired ULD 104, such as from an external bag staging area. However, such action may generate extra reads to the BMS from the readers that the bag passes.

Figure 13:
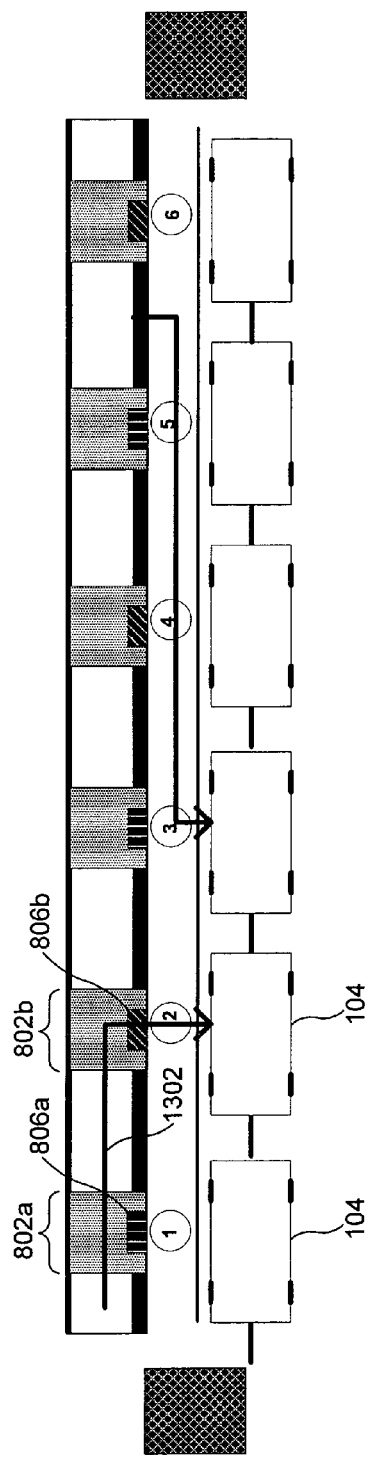
FIG. 13 shows a baggage handler using a conveyor to move a bag to an appropriate ULD before placing it inside.

Bags on a conveyor are selected as appropriate for placement into a ULD. Similar to external bag delivery, a barcode tag on a selected bag can be examined to determine the appropriate ULD it is to be placed in. If the conveyor is full of bags, a bag may be removed from anywhere on the line and carried directly to the appropriate ULD. Note that if the bag is transported to the destination ULD with the tag facing down (away from the readers) interim reads will be minimized. If the conveyor is empty, a baggage handler may use the conveyor to move the bag as close as possible to the appropriate ULD before placing it inside, such as shown in FIG. 13 for a bag (shown as moving along a path indicated by an arrow 1304 in FIG. 13).

In step 1118, a bag is removed from the cart, and operation proceeds to step 1116 for the removed bag.

In step 1112, if the tag of the bag is visible (e.g., on the top side of the bag), operation proceeds to step 1120 (when present). Alternatively, when the tag of the bag is not visible, operation proceeds to step 1122. Bags arriving on the conveyor may be checked to see if the RFID tag on the bag is facing up. If it is, baggage handlers have the option of flipping, or otherwise repositioning the bag so that the tag is facing towards the belt. By doing this, extra reads to the BMS will be minimized as the bag travels down the conveyor belt.

In step 1120 (when present), the bag is repositioned to move the tag to the bottom side of the bag (e.g., the bag may be flipped over so that the tag is face down on the conveyor). Operation proceeds to step 1124.

In step 1122, the bag is not repositioned. Operation proceeds to step 1124.

In step 1124, the bag is selected from the conveyor. Operation proceeds to step 1116.

In step 1126, the bag is placed in the ULD. Operation proceeds to step 1128. Regardless of how a bag arrives at a conveyor, when the bag is placed into the ULD, the baggage handlers should try to ensure that the RF tag on the bag is facing up and pointing towards the reader antenna prior to placement in the ULD. Doing this will maximize the read rate of the tags.

In step 1128, if the OFU responds, operation proceeds to step 1130. Alternatively, if the OFU does not respond, operation proceeds to step 1134. For example, as the bag enters the capture zone, the tag will be read by the reader, and the OFU will respond with an indicator, such as a light, to indicate whether the bag can be loaded.

In step 1130, if the OFU status is positive (e.g., bag is properly placed), operation proceeds to step 1132. Alternatively, if the OFU status is negative (e.g., the bag is not properly placed), operation proceeds to step 1116. For example, in an embodiment, the OFU responds to a bag read with either a red or a green light. The duration of this light response is user definable, and should be long enough for the baggage handler to easily notice, such as for 2 seconds. For example, if the OFU shows a solid green light and presents a short audible tone, the bag is at the correct ULD and should be placed inside. If the OFU shows a solid red light and a long audible tone, the bag is incorrect and should not be loaded into that ULD. In this case, the bag label is re-examined, and the bag is transported to the appropriate ULD.

In step 1132, the bag is placed/allowed to remain in the ULD. Operation proceeds to step 1142.

In step 1134, the bag is repositioned to attempt to have the associated tag read. Operation proceeds to step 1136.

In step 1136, if the OFU responds, operation proceeds to step 1130. Alternatively, if the OFU does not respond, operation proceeds to step 1138.

In step 1138, the bag is moved aside (e.g., placed back on the conveyor). Operation proceeds to step 1140.

In step 1140, the bag is processed using a hand-held (or other computing device). Operation proceeds to step 1142.

In step 1142, if the bag is the last bag to be processed, operation proceeds to step 1144. Alternatively, if there are further bags to process, operation proceeds to step 1146.

In step 1144, the manifest is reconciled.

In step 1146, a next bag is selected. Operation proceeds to step 1116 for the next bag.

If baggage handlers take a bag to a desired ULD, and thereby pass in front of other OFUs, the interim OFUs may read the tag and respond with a light sequence. This can be a normal part of the operation and any feedback from these OFUs can be ignored. However, care should be taken as bags are taken past intermediate ULDs and their associated read areas, to ensure they are not triggering OFU lights at the same time another bag is being loaded into that particular ULD. To avoid this problem, if a first person is loading a ULD, a second person can wait until the first person has actually loaded the bag before passing through the read area. In another example, a person can place their hand over a tag while in transit to the destination ULD to prevent the tag from being read at intermediate locations.

Example Operator Instructions

Figure 15:
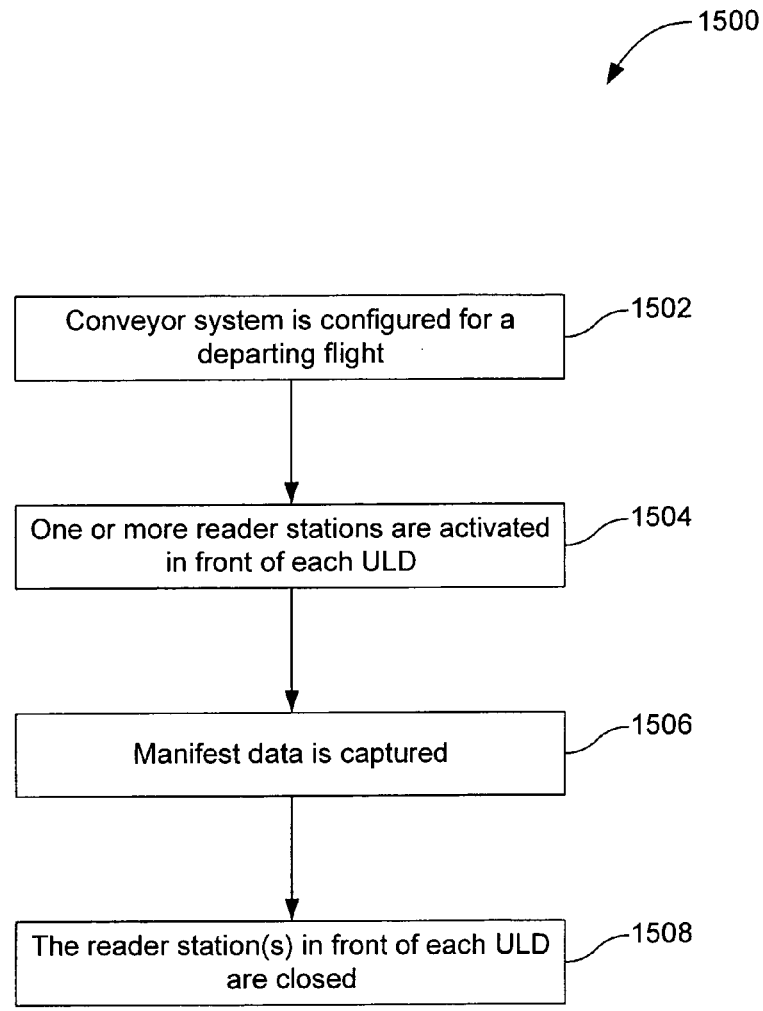
FIG. 15 shows an example flowchart providing steps for operating a conveyor system, according to an example embodiment of the present invention.

FIG. 15 shows an example flowchart 1500, describing operation of a conveyor system, according to an example embodiments of the present invention. Other structural embodiments will be apparent to persons skilled in the relevant art(s) based on the following discussion. The steps of flowchart 1500 are described in detail below.

In step 1502, a conveyor system is configured for a departing flight.

In step 1504, one or more reader stations are activated in front of each ULD.

In step 1506, manifest data is captured.

In step 1508, the reader station(s) in front of each ULD are closed.

Details relating to the steps of flowchart 1500 with respect to example embodiments are further described below.

Configuration of the Conveyor System

With regard to step 1502, configuration of the conveyor system to track bags can be accomplished using a wireless-enabled hand held device, or other device. For example, a hand held device can be used to initially communicate with the BMS to associate/assign the flight to the conveyor, and then assign each conveyor as necessary to a ULD, along with the type of bags that it will contain.

Once the device has configured the conveyor system for use, each station can be activated to start the data collection process.

Activation of Reader Stations

With regard to step 1504, each station contains an antenna and an OFU. In an embodiment, the OFU includes a set of three lights and a buzzer which are mounted on top of the antenna, and a momentary contact button which is mounted on a box directly below the antenna. Once the hand held device (or other device) has been used to configure the conveyor with the flight and ULD information, a reader station can be activated by pushing the button on the OFU. Once this is done, the antenna is activated, and any RFID tags seen by the reader station will signal an OFU response.

Capturing of Manifest Data

With regard to step 1506, bags being processed on the conveyor should each have a valid RFID tag attached to it. The data on this tag is captured and used to generate the bag manifest for the flight. Manifest data is normally captured as bags are placed into the ULD, but can also be captured manually, such as in the case of a faulty or missing tag (such as in step 1140 of FIG. 11, described above).

Closing of Reader Station in Front of Each ULD

With regard to step 1508, after the appropriate bags have been loaded into the ULD at a reader station, the ULD can be "closed" from a data collection perspective. Closing a reader station essentially means that the antenna and OFU are disabled, and will not record any more bag information. In an embodiment, to close a reader station at a conveyor, a button underneath the OFU of the desired reader station is pressed.

Bill of Materials for an Example Conveyor System

Figure 14:
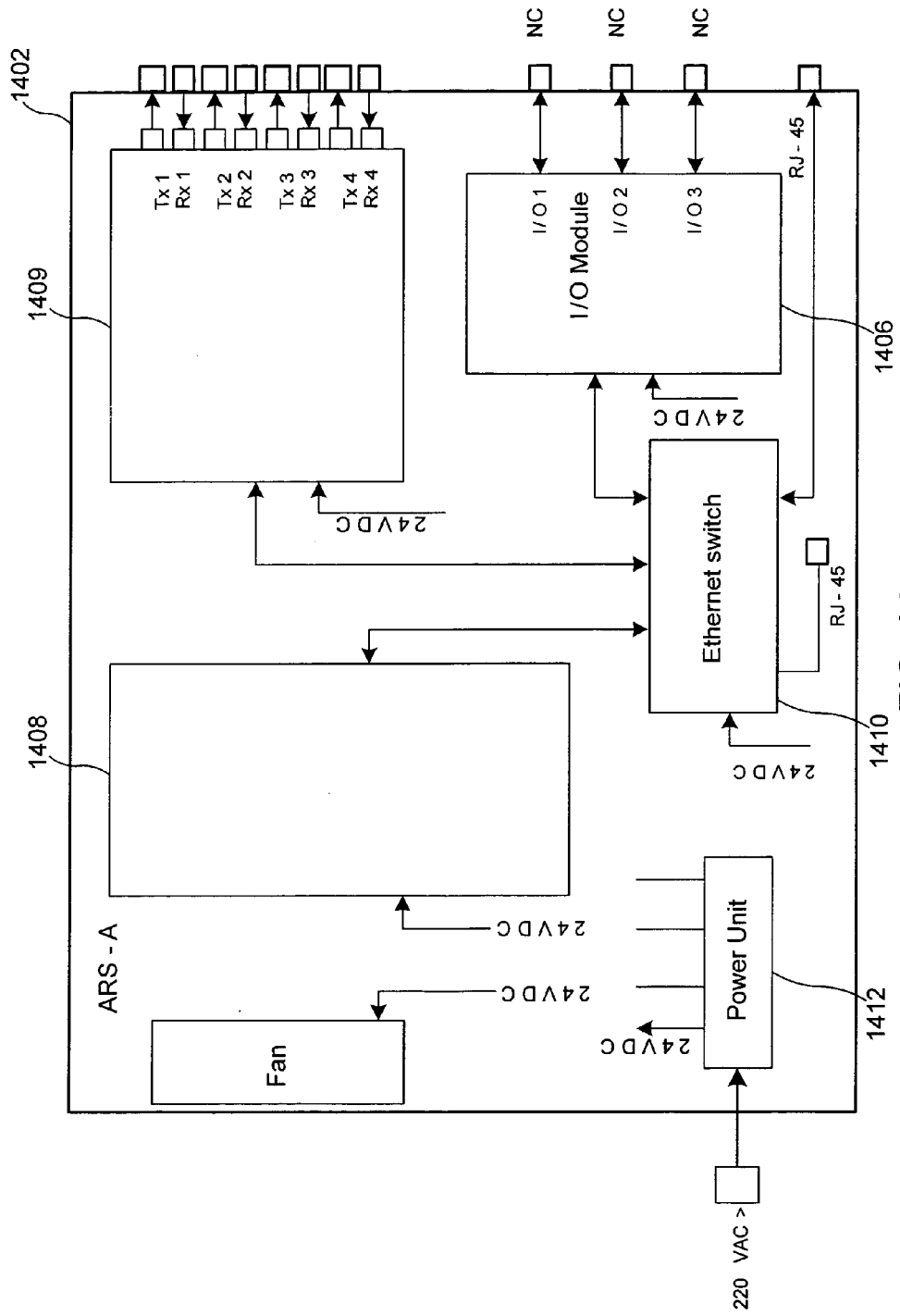
FIG. 14 shows a block diagram for a reader, according to an embodiment of the present invention.

FIG. 14 shows a block diagram for a reader 1402, according to an example embodiment of the present invention. For instance, reader 1402 is an example of a controller 1006 shown in FIG. 10. In the example of FIG. 14, reader 1402 includes a reader module 1404, an I/O module 1406, a serial board 1408, an Ethernet switch 1410, and a power unit 1412.

Reader module 1404 includes one or more receiver and transmitter pair signal ports for communications with four corresponding antennas. Four receiver and transmitter pairs are shown in the example of FIG. 14. In an embodiment, for example, reader module 1404 can be a special purpose or commercially available reader, such as an AR-400 reader sold by Matrics, Inc., of Columbia, Md.

I/O module 1406 has one or more I/O signal ports for communicating with one or more OFUs. Three I/O signal ports are shown in the example of FIG. 14.

Serial board 1408 provides serial communication functionality and buffering for reader 1402.

Ethernet switch 1410 is used to interface reader module 1404, I/O module 1406, and serial board 1408 of reader 1402. Furthermore, Ethernet switch 1410 may be coupled to a BMS, to allow reader 1402 to communicate with the BMS.

Power unit 1412 receives an external input voltage, and converts the input voltage/power to an appropriate output voltage/power for powering the components of reader 1402. For example, power unit 1412 may convert an input voltage of 220 V AC (alternating current) to an output voltage of 24 V DC (direct current). In an embodiment, all reader stations 1402 are connected to a dedicated and conditioned power circuit to avoid voltage fluctuations from large motors, etc., such as starting and stopping. In an example embodiment, a controller 1006 of FIG. 10 includes reader module 1404, I/O module 1406, serial board 1408, Ethernet switch 1410, and power unit 1412. In an example embodiment, reader module 1404 is an AR400 reader, distributed by Matrics, Inc. of Columbia, Md., or other reader type. In an example embodiment, I/O module 1406 is an I/O module distributed by Acromag of Wixom, Mich., or other I/O module type. In an example embodiment, serial board 1408 is a multiport serial board distributed by Moxa Technologies, Inc., of Brea, Calif., or other serial board type. In an example embodiment, architecture 1000 of FIG. 10 can be incorporated into a Gantry system. For example, the Gantry system can be commercially available, or custom built to support six reader stations.

Fault Management

A lateral conveyor reader system can suffer from one or more problems, including those described in this subsection. For example, the system may suffer from excessive reads of tags on conveyor belts. Possible causes for this problem may include an antenna angle that is too sharp, a ULD that is mis-positioned, or one or more bags positioned too far forward on a conveyor belt. Thus, this problem may be corrected, as would be understood by persons skilled in the relevant art(s) from the teachings herein.

In another example, a system may suffer from difficult and/or slow tag reads. Possible causes for this problem may include a damaged tag, an operator standing between an OFU and a bag, a tag not oriented properly with respect to an antenna, or a ULD located too far from an antenna. Thus, this problem may be corrected, as would be understood by persons skilled in the relevant art(s) from the teachings herein.

In an embodiment, a system may suffer from a problem of not being able to read a bag. Possible causes for this problem may include a damaged tag, a bag already seen by a reader, a reader station that is not registered, or a reader station that is not activated. Thus, this problem may be corrected, as would be understood by persons skilled in the relevant art(s) from the teachings herein.

Operation Verification

Once a conveyor system has been installed and configured, a test procedure may be followed to ensure that an installed conveyor system is functioning correctly. The test procedure identifies and notes error conditions, which can then be corrected. A test procedure can be repeated until the system operates at 100%.

In order to perform the below described example functional test, ULDs and bags are not required, only the tags and information necessary to test the system are used.

Example Functional Test

A purpose of this example functional test is to verify the operational status of conveyor system components and software.

Items used for the example test include: (a) a RFID test tag set consisting of a set of six tags, each assigned to a respective unique ULD position at the conveyor; (b) a test flight manifest linking the RFID test tag set to the six corresponding ULDs; (c) barcode or similar information identifying the six test ULDs to the BMS system.

Figure 16:
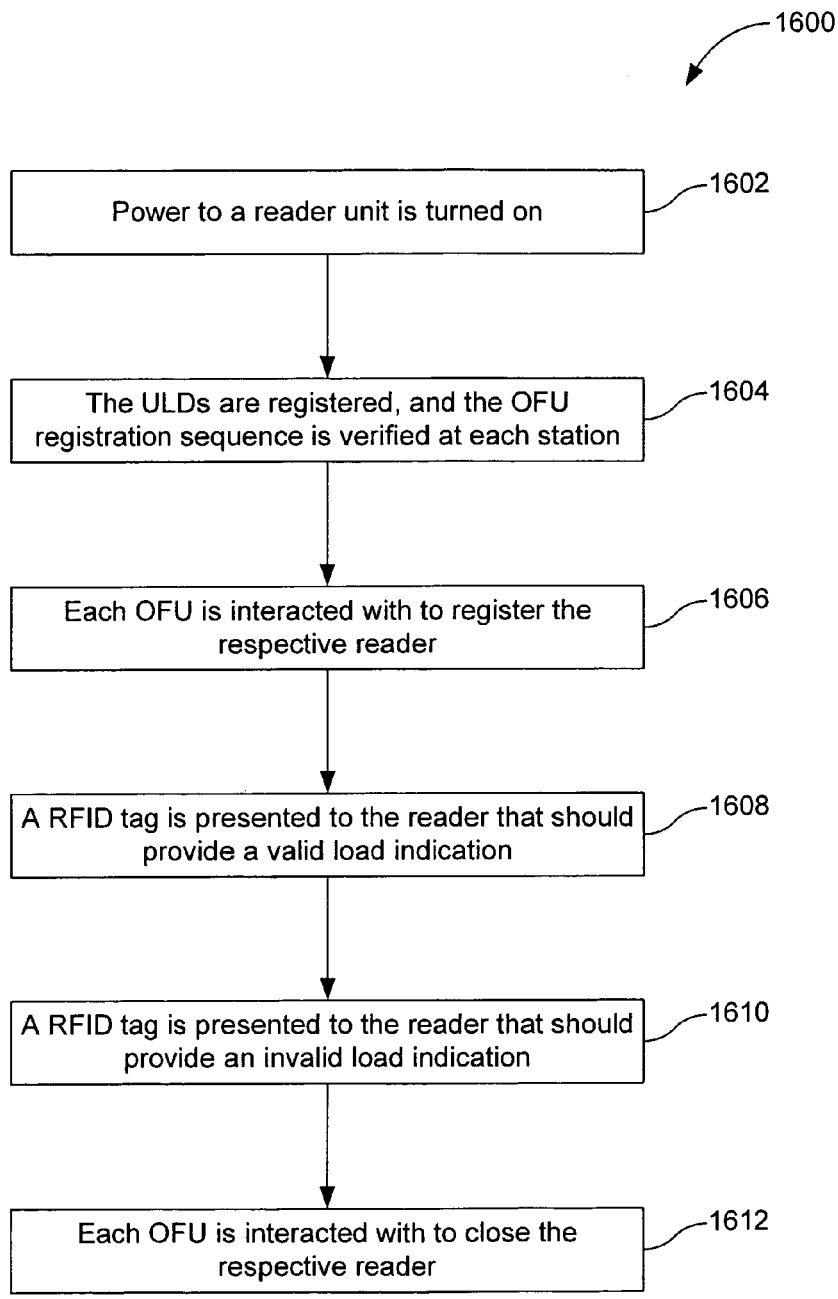
FIG. 16 shows a flowchart providing an example functional test procedure for a conveyor system, according to embodiments of the present invention.

FIG. 16 shows a flowchart 1600, providing an example functional test procedure for a conveyor system, according to embodiments of the present invention. The steps of FIG. 16 do not necessarily have to occur in the order shown, as will be apparent to persons skilled in the relevant art(s) based on the teachings herein. Furthermore, not all steps of flowchart 1100 are required in every application, and in some applications, additional or alternative steps occur. These alternative embodiments are also within the scope and spirit of the present invention. Other structural embodiments will be apparent to persons skilled in the relevant art(s) based on the following discussion. The steps of flowchart 1600 are described in detail below.

In step 1602, power to a reader unit is turned on. In an example embodiment, an operator verifies that a yellow light is on for each OFU.

In step 1604, the ULDs are registered, and the OFU registration sequence is verified at each station. For example, a handheld device (or other computing device) can be used.

In step 1606, each OFU is interacted with to register the respective reader. In an example embodiment, a button at each OFU is pushed to register the reader. The OFU is observed to verify that proper feedback is received.

In step 1608, a RFID tag is presented to the reader that should provide a valid load indication. For example, a RFID tag that does match the conveyor position can be presented to test for the valid load indication. The OFU is observed to verify that proper feedback for a valid load is received.

In step 1610, a RFID tag is presented to the reader that should provide an invalid load indication. For example, a RFID tag that does not match the conveyor position can be presented to test for the invalid load indication. The OFU is observed to verify that proper feedback for an invalid load is received.

In step 1612, each OFU is interacted with to close the respective reader. In an example embodiment, a button at each OFU is pushed to close the reader. The OFU is observed to verify that proper feedback is received.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A tracking system for tracking objects, the objects each having a corresponding radio frequency identification (RFID) tag associated therewith, comprising:
at least one conveyor belt that transports the objects;
at least one antenna placed in a corresponding stationary coverage area associated with said at least one antenna, wherein said coverage area is arranged adjacent to said at least one conveyor belt;
a reader that is coupled to said at least one antenna, wherein a unit load device (ULD) is positioned adjacent to said at least one conveyor belt in said stationary coverage area of said at least one antenna, wherein said reader reads the tags as the objects associated with the tags enter said coverage area;
an object management system (OMS) that receives information regarding read tags from said reader, and stores said information; and
an operator feedback unit (OFU) that enables an operator to interact with said reader.

2. The tracking system of claim 1, wherein the objects include baggage.

3. The tracking system of claim 2, wherein said at least one conveyor belt is used to route said baggage in an airport.

4. The tracking system of claim 2, wherein said OMS is a baggage management system (BMS).

5. The tracking system of claim 1, wherein said at least one conveyor belt comprises a first conveyor belt and a second conveyor belt.

6. The tracking system of claim 5, wherein said first conveyor belt moves objects on said first conveyor belt in a first direction opposite from a second direction in which said second conveyor belt moves objects.

7. The tracking system of claim 5, wherein said first and second conveyor belts are positioned in a stacked configuration.

8. The tracking system of claim 5, wherein said first conveyor belt transports baggage from a baggage check-in area to the aircraft, and said second conveyor belt transports baggage from the aircraft to a baggage pick-up area.

9. The tracking system of claim 1, wherein the objects are loaded from the ULD onto said at least one conveyor belt.

10. The tracking system of claim 1, wherein the objects are loaded from the at least one conveyor belt into the ULD.

11. The tracking system of claim 1, wherein the reader is a fixed reader.

12. The tracking system of claim 1, wherein the reader is a movable reader.

13. The tracking system of claim 1, wherein said OMS uses said information to track location of the objects.

14. The tracking system of claim 1, wherein said OFU comprises at least one indicator providing an indication related to operation of the reader to the operator.

15. The tracking system of claim 1, wherein said OFU comprises at least one input device that enables the operator to control operation of the reader.

16. The tracking system of claim 1, further comprises a plurality of antennas and a plurality of OFUs, each said OFU corresponding to a distinct antenna.

17. The tracking system of claim 1, wherein said reader is coupled to a plurality of antennas, wherein each of said plurality of antennas has a corresponding stationary coverage area, wherein a ULD is positioned in at least one of said coverage areas of said plurality of antennas, wherein said reader reads the tags as the objects associated with the tags enter said coverage area.

18. The tracking system of claim 1, further comprising:
a second reader that is coupled to a second antenna, wherein a second ULD is positioned in a coverage area of said second antenna, wherein said second reader reads the tags associated with the objects positioned in said coverage area of said second antenna;
wherein said OMS receives and stores information regarding read tags from said second reader.

19. The tracking system of claim 1, wherein said reader comprises:
an input/output module;
an Ethernet switch; and
a power unit.

20. The tracking system of claim 1, wherein said reader reads a tag of an object that the operator places into the ULD.

21. The tracking system of claim 20, wherein the operator places the object into the ULD from said at least one conveyor belt.

22. The tracking system of claim 1, wherein said reader reads a tag of an object that the operator places onto said at least one conveyor belt.

23. The tracking system of claim 22, wherein the operator places the object onto said at least one conveyor belt from the ULD.

24. The tracking system of claim 1, wherein said OMS associates an antenna with said ULD.

25. The tracking system of claim 1, wherein said OMS tracks which of the objects are associated with the ULD.

26. The tracking system of claim 1, wherein the reader automatically tracks the objects as the objects enter the stationary coverage area.

27. A method for tracking objects, the objects each having a corresponding radio frequency identification (RFID) tag associated therewith, comprising:
   (a) selecting an object from an object carrier;
   (b) analyzing a RFID tag associated with the object to determine a unit load device (ULD) to contain the object;
   (c) positioning the object in the determined ULD;
   (d) reading the RFID tag of the object;
   (e) receiving an indicator output that indicates whether the determined ULD is the correct ULD for the object;
   (f) if the indicator output indicates the determined ULD is not the correct ULD for the object:
      (1) removing the object from the determined ULD, and
      (2) returning to step (b) for the object,
   (g) if the indicator output indicates the determined ULD is the correct ULD for the object:
      (1) determining whether the object carrier has another object, and
      (2) if the object carrier is determined to have another object, selecting the another object from the object carrier, and returning to step (b) for the another object.

28. The method of claim 27, wherein the object carrier is a conveyor, wherein step (a) comprises:
   selecting the object from the conveyor.

29. The method of claim 27, wherein the object carrier is a cart, wherein step (a) comprises:
   selecting the object from the cart.

30. The method of claim 27, wherein step (b) comprises:
   scanning a bar code of the RFID tag.

31. The method of claim 26, wherein step (b) comprises:
   reading text associated with the RFID tag.

32. The method of claim 27, wherein step (d) comprises:
   (1) attempting to read the RFID tag;
   (2) receiving an indicator output that indicates whether the RFID tag was successfully read; and
   (3) if the indicator output indicates the RFID tag was not successfully read, adjusting a position of the object and returning to step (1) for the RFID tag.

33. The method of claim 27, wherein an RFID reader is used to read the RFID tag in step (d), the method further comprising:
   (h) prior to step (a), activating the RFID reader.

34. The method of claim 33, the method further comprising:
   (i) after step (g), deactivating the RFID reader.

35. The method of claim 27, further comprising:
   (h) generating a manifest.

36. The method of claim 27, wherein the objects are baggage being transported in an airport, wherein step (a) comprises:
   selecting a bag from the object carrier.

* * * * *

UNITED STATES PATENT AND TRADEMARK OFFICE
CERTIFICATE OF CORRECTION

PATENT NO. : 7,195,159 B2 Page 1 of 1
APPLICATION NO. : 11/025961
DATED : March 27, 2007
INVENTOR(S) : Michael Sloan It is certified that error appears in the above-identified patent and that said Letters Patent is hereby corrected as shown below:

At column 18, line 13, "claim 26" should be replaced with --claim 27--.

Signed and Sealed this

Tenth Day of July, 2007

JON W. DUDAS
*Director of the United States Patent and Trademark Office*